March 29, 1960 F. G. CLARK 2,930,123
BEVEL CUTTING MACHINE
Filed Nov. 17, 1958 2 Sheets-Sheet 1

INVENTOR.
Frederick G. Clark,
BY
Parker & Buchmor,
Attorneys.

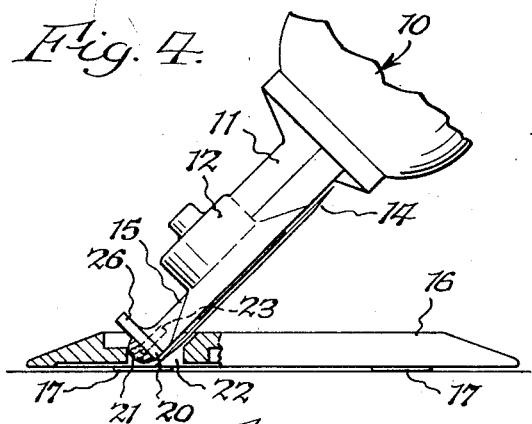
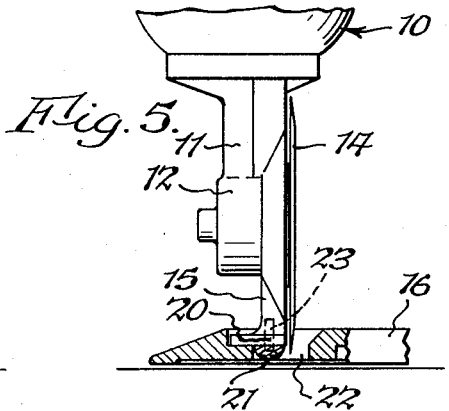
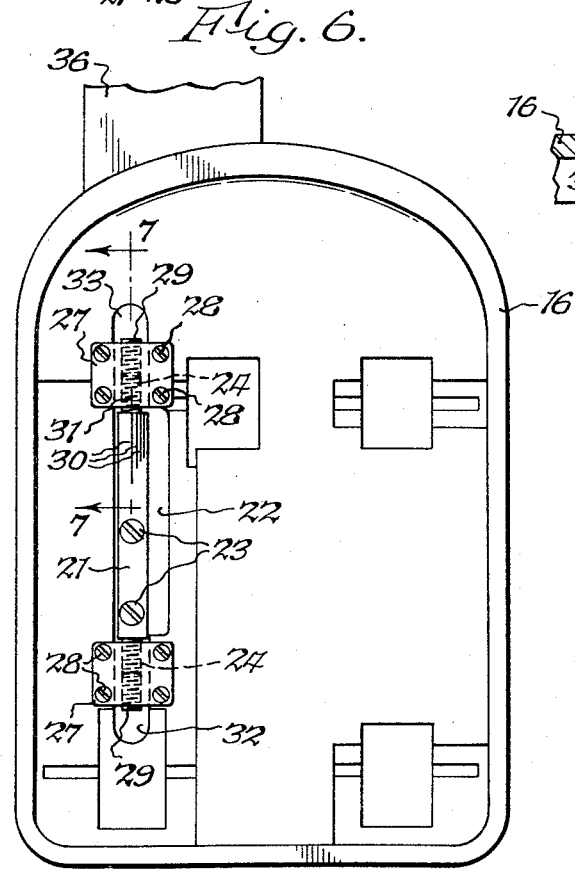
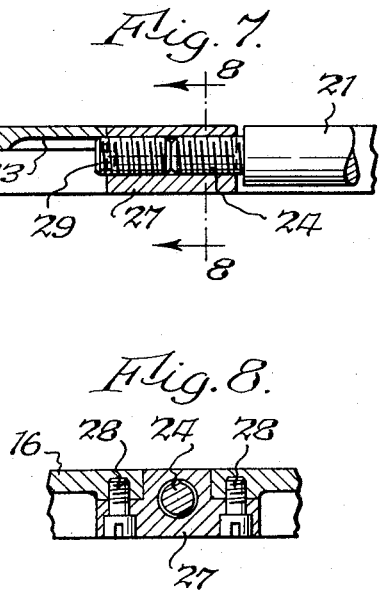

United States Patent Office 2,930,123
Patented Mar. 29, 1960

2,930,123
BEVEL CUTTING MACHINE

Frederick G. Clark, Buffalo, N.Y., assignor to Eastman Machine Company, Buffalo, N.Y.

Application November 17, 1958, Serial No. 774,486

10 Claims. (Cl. 30—276)

This invention relates to machines for cutting a beveled edge on carpeting or similar material.

Carpets are bought by dealers in rolls of various standard widths and lengths and are cut to size as required by their customers. At the present time carpet manufacturers have been impregnating the backing of the carpets with a plastic material that bonds the threads together and prevents raveling. This eliminates the necessity for binding the cut edges, but when cut square or perpendicular to their surfaces, pile carpeting has an unfinished and unattractive appearance. This created a demand for a cutting machine that would cut the edge and the upright pile adjacent to the edge at an angle.

Machines heretofore provided for effecting this beveled cutting were made with an included angle between the knife and the base of 45°. This was satisfactory for some types of carpeting, but it was found that other types looked better with a 60° or possibly a 75° angle at the edge. Consequently adapters for application to cutting machines were provided to enable the machines to cut the carpeting at various angles, but considerable time was required to apply an adapter of this kind to a cutting machine, which was of course unsatisfactory when a dealer had to make a considerable number of cuts of different angles, which might require changing the adapters several times a day with considerable loss of time. The alternative was for a dealer to have three or four machines all set to cut at different angles, but this was expensive unless the dealer had to cut a large volume.

It is consequently an object of this invention to provide a cutting machine which could be readily adjusted to cut at various angles.

Another object is to provide means for quickly and securely locking the motor and knife-carrying element of a cutting machine at the desired angular position.

A further object is to provide an adjusting means for the machine which can be located on the under side of the base plate and which is sufficiently small in upright dimensions so that the base plate could be kept at a nominal height to avoid increasing the effort necessary to slide the base plate under heavy carpeting.

In the accompanying drawings which illustrate by way of example one embodiment of my invention:

Figure 1:
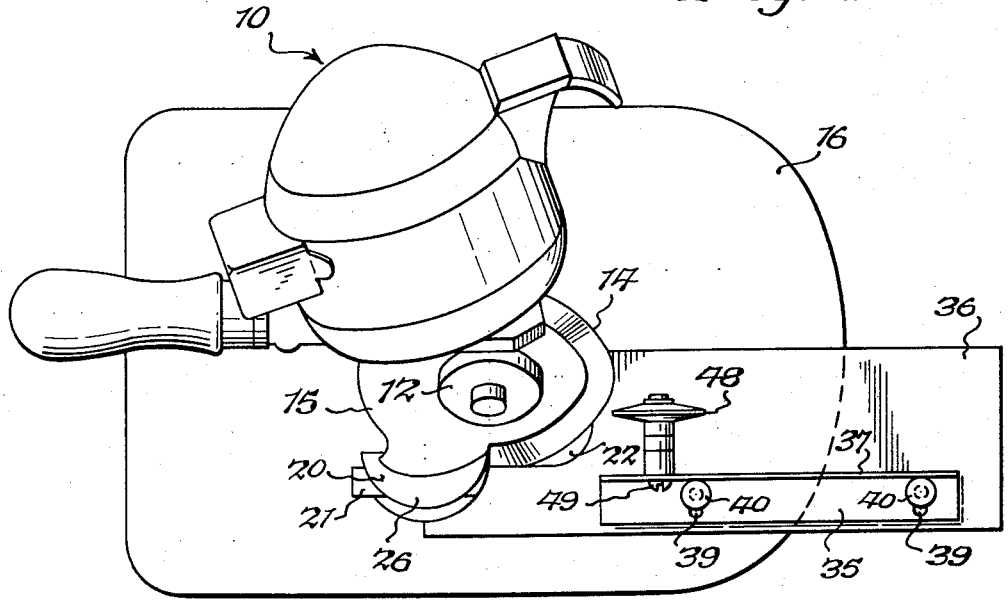
Fig. 1 is a top plan view of a cutting machine embodying this invention.
Figure 2:
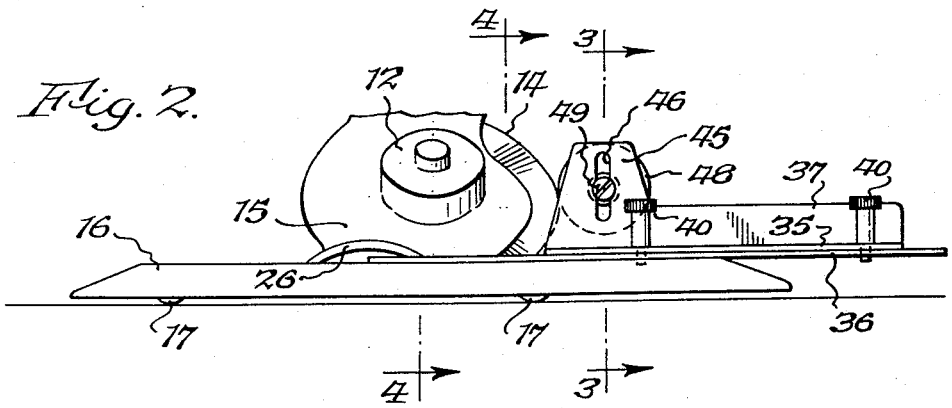
Fig. 2 is a fragmentary side elevation thereof.
Figure 3:
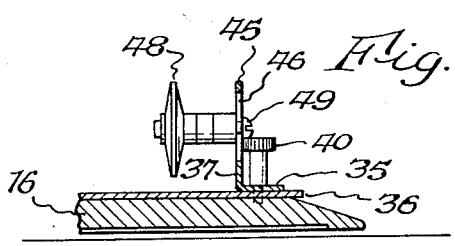

Figs. 3 and 4 are transverse sectional elevations thereof on lines 3—3 and 4—4 respectively of Fig. 2.

Fig. 5 is a sectional elevation similar to Fig. 4, but showing the apparatus adjusted for cutting at 90° from the plane of the carpeting or other work.

Fig. 6 is a bottom plan view of the base of the apparatus.

Fig. 7 is a fragmentary sectional view thereof on an enlarged scale on line 7—7 Fig. 6.

Fig. 8 is a fragmentary sectional elevation on line 8—8 Fig. 7.

The cutting mechanism of the machine may be of any usual or suitable kind such as heretofore employed in cutting machines in which the knife or cutting blade was perpendicular to the work. The cutting mechanism shown includes a motor 10 having a drive shaft extending through a housing 11 to a gear box 12 in which is contained suitable gearing for driving the circular cutting blade 14. All of these parts are suitably mounted on a standard 15, the lower end of which is mounted on a base plate 16 provided with the usual rollers 17 which enable the cutting apparatus to be moved along a table or platform on which the work to be cut is laid.

In prior cutting machines the standard 15 was fixedly mounted on the base plate, but according to my invention the lower end of the standard is adjustably mounted on the base plate in such a manner as to permit the standard and parts mounted thereon to be moved into different angular relation to the base plate or an axis extending lengthwise of the base plate. In the construction shown for this purpose I have provided the standard with a foot 20 which is suitably mounted on a hinge pin 21 adjustably secured in a recess 22 extending lengthwise of the base plate. This hinge pin 21 has an intermediate portion which is approximately semi-circular in cross section thus providing a flat surface to which the foot of the standard may be secured in any suitable manner, for example by screws 23 which extend through holes in the hinge pin and have threaded engagement in the base of the standard.

Any suitable means may be provided for securing the hinge pin in various angular positions about its axis. In the construction shown for this purpose the opposite ends 24 of the hinge pin are of reduced diameter and are threaded. These threaded ends have screw threaded engagement with internally threaded blocks 27 suitably mounted on the base plate 16, for example by means of screws 28. The hinge pin can consequently turn about its threaded connection with the blocks for adjusting the standard 15 to the desired angle. The threaded ends 24 of the hinge pin are considerably shorter than the internally threaded bores in the blocks 27. In order to hold the hinge pin at any set angle with relation to the blocks 27, locking or set screws 29 are provided which also enter the threaded holes in the blocks 27 and when these locking or set screws 29 are turned, for example by means of an Allen wrench, into engagement with the threaded ends 24 of the hinge pin, the hinge pin becomes securely locked against rotation. The hinge pin may be provided with graduations 30 corresponding to the angles at which the standard may be secured relatively to the base plate, these graduations cooperating with a guide line 31 formed on the adjacent block 27. The foot 20 of the standard may be provided with an extension 26, which, when the standard is in vertical position, engages in a recess in the base plate 16 to facilitate positioning the standard in vertical position.

To change the angle of the standard relatively to the base plate, it is only necessary to lay the machine on its side and to loosen the two set screws 29 and to tilt the base plate to the required angle as indicated by the graduations 30 and then to retighten the set screws. This provides a positive lock in both directions because any radial movement of the hinge pin results in a correspondingly axial movement in the direction of and into binding engagement with one or other of the set screws. In order to make possible the application of an angle socket wrench to the set screws, the bottom face of the base plate is provided with grooves or recesses 32 and 33 from which the set screws are readily accessible.

I have also provided gauge means of improved construction for directing the carpeting or other work into the desired relation to the knife 14. In the construction shown for this purpose the gauge is in the form of a member of angular shaped cross section having a lower or horizontal leg or flange 35 secured to a cover plate 36 which is secured to the top face of the base plate 16. The other flange 37 of this gauge member extends upwardly so that the edge of the work may be guided along this flange. The gauge member is adjustable on the cover plate by providing its lower flange with transverse slots 39 through which thumb screws 40 extend. These thumb screws have a threaded engagement with the cover plate 36 and thus permit adjustment of the gage in a direction crosswise of the base plate 16 toward and away from the line in which the knife makes a cut. The upwardly extending flange 37 of the gauge member has an extension 45 provided with an upright slot 46 through which the axle of a bevel wheel 48 extends. This axle may be secured in any desired position in the upright slot 46 by means of a set screw 49.

In the use of the machine the gauge may be adjusted by means of the set screws 40 to engage the edge of the carpeting in such a manner that the correct amount of material is trimmed off of the same to provide a full bevel. The bevel wheel 48 is adjusted downwardly into the pile of the carpet so as to press lightly against the base or backing of the carpet to hold down the material and prevent it from buckling ahead of the knife.

When the machine is in use and the motor is turned on to rotate the knife, the machine is pushed along the length of the edge of the carpeting which is being bevelled and during this movement the machine is guided by the vertical face 37 of the gauge. The bevel wheel 48 however does not disturb the upright position of the pile, which must remain upright in order to be properly trimmed.

It will be understood that various changes in the details, materials and arrangements of parts, which have been herein described and illustrated in order to explain the nature of the invention, may be made by those skilled in the art, within the principle and scope of the invention, as expressed in the appended claims.

I claim:

1. A cutting machine including a rotary knife, a base plate movable on a supporting surface under the work to be cut, a standard mounted on said base plate and supporting said knife, a hinged connection between said base plate and said standard and including a hinge pin extending lengthwise of said base and to which said standard is secured to enable said standard and knife to be adjusted to different angles relatively to the base plate for cutting bevel edges on the work, blocks secured to said base plate and in which the ends of said hinge pin are rotatably mounted, and locking means in said blocks for releasably locking said standard in different angular relations to said base plate.

2. A cutting machine including a rotary knife, a base plate movable on a supporting surface under the work to be cut, a standard mounted on said base plate and supporting said knife, a hinged connection between said base plate and said standard and which includes a hinge pin to which said standard is secured and extending lengthwise of said base plate and having its ends screw threaded, correspondingly threaded parts on said base plate with which said ends of said hinge pin engage, and locking screws also arranged in said correspondingly threaded parts of said base plate and movable into engagement with said ends of said hinge pin when said standard has been set into the desired angular relation to said base plate, for locking said hinge pin against movement about it axis.

3. A cutting machine according to claim 2 in which said standard is provided at the lower end thereof with a projection and a part on said base plate with which said projection engages when said standard is in upright position relatively to said base plate.

4. A cutting machine according to claim 2 in which said hinge pin and said locking screws are arranged below the upper surface of said base plate.

5. A cutting machine including a rotary knife, a base plate movable on a supporting surface under the work to be cut, a standard mounted on said base plate and supporting said knife, a hinge pin extending lengthwise of said base plate and on which said standard is rigidly secured, said hinge pin having screw-threaded ends, blocks rigidly mounted on said base plate and having screw threads corresponding to those of said hinge pin and in which said threaded ends of said hinge pin engage, and locking screws also extending into said threaded portions of said blocks and movable against the ends of said locking pin when said standard has been adjusted into the desired angular relation to said base plate for locking said hinge pin against movement about its axis relatively to said blocks.

6. A cutting machine according to claim 5 in which said base plate is provided with a slot in which said hinge pin is located beneath the upper surface of said base plate, and in which said blocks are arranged at the ends of said slot below said upper surface of said base plate.

7. A cutting machine for cutting a bevel edge on work including a knife, a base plate movable on a supporting surface under the work to be cut, a standard mounted on said base plate for supporting said knife in an angular relation to said base plate, a gauge mounted on said base plate in advance of said knife and adjustable transversely of said base plate for presenting the edge of the work to be cut into correct relation to said knife.

8. A cutting machine according to claim 7 in which said gauge is of angular shape in cross section and having a leg adjustably mounted on said base plate toward and from the line of cut of said knife, and an upwardly extending leg for guiding the edge of the work to be cut in correct relation to said knife.

9. A cutting machine according to claim 7 in which said gauge is of angular shape in cross section and having a leg adjustably mounted on said base plate toward and from the line of cut of said knife, and an upwardly extending leg for guiding the edge of the work to be cut in correct relation to said knife, an upwardly extending part on said upright leg of said gauge, and a wheel adjustably mounted on said upwardly extending part in position to press down the work passing to said knife to prevent buckling of the same.

10. A cutting machine for cutting a bevel edge on work including a knife, a base plate movable on a supporting surface under the work to be cut, a standard mounted on said base plate for supporting said knife in an angular relation to said base plate, and a hold-down wheel mounted on said base plate in advance of said knife and having an outwardly bevelled edge portion for extending into the pile when the machine is used for cutting carpeting.

No references cited.